(12) United States Patent
Lagorce et al.

(10) Patent No.: US 9,379,642 B2
(45) Date of Patent: Jun. 28, 2016

(54) SWITCHED-MODE POWER SUPPLY SYSTEM AND AIRCRAFT COMPRISING SUCH A SYSTEM

(71) Applicant: THALES, Neuilly sur Seine (FR)

(72) Inventors: Vivien Lagorce, Valence (FR);
Christophe Taurand, Valence (FR);
François Klein, Valence (FR)

(73) Assignee: THALES, Neuilly sur Seine (FR)

( * ) Notice: Subject to any disclaimer, the term of this patent is extended or adjusted under 35 U.S.C. 154(b) by 245 days.

(21) Appl. No.: 14/135,736

(22) Filed: Dec. 20, 2013

(65) Prior Publication Data
US 2014/0177300 A1    Jun. 26, 2014

(30) Foreign Application Priority Data
Dec. 21, 2012    (FR) .................................... 12 03580

(51) Int. Cl.
*H02M 3/158*    (2006.01)
*H02M 7/5387*   (2007.01)
*H02M 7/48*     (2007.01)
*H02M 1/00*     (2006.01)

(52) U.S. Cl.
CPC ............ *H02M 7/5387* (2013.01); *H02M 3/158* (2013.01); *H02M 7/4826* (2013.01); *H02M 2001/007* (2013.01)

(58) Field of Classification Search
CPC .......... H02M 3/158; H02M 2001/007; H02M 2001/0083; H02M 2003/1557; H02M 3/156
See application file for complete search history.

(56) References Cited

U.S. PATENT DOCUMENTS

| | | | |
|---|---|---|---|
| 5,568,368 A | 10/1996 | Steigerwald et al. | |
| 5,594,635 A * | 1/1997 | Gegner ................ | H02M 3/158 363/124 |
| 5,717,584 A | 2/1998 | Rajashekara et al. | |
| 6,525,513 B1 * | 2/2003 | Zhao ..................... | H02M 3/158 323/222 |
| 2005/0036345 A1 | 2/2005 | Lin et al. | |

OTHER PUBLICATIONS

European Search Report for priority document FR 12-03580 mailed Jul. 3, 2013.

* cited by examiner

*Primary Examiner* — Harry Behm
(74) *Attorney, Agent, or Firm* — Polsinelli PC

(57) ABSTRACT

An electric power supply system, comprising:
   a main switching cell (6) comprising a first main branch (14) and a second main branch (16) each including a main switch (T1, T2), and
   an auxiliary switching cell (10) connected to the main switching cell (6) and comprising a first secondary branch (20) and a second secondary branch (22) on the one hand, each including a secondary switch (T3, T4) and a connection branch (24) for connecting the auxiliary switching cell (10) to the main switching cell (6) on the other hand, the connection branch (24) including a switching inductor (L1),
   the main switching cell (6) and the auxiliary switching cell (10) being connected, cascaded from each other.
The auxiliary switching cell (10) comprises at least two switching capacitors (C1, C2) positioned parallel to one of the secondary switches (T3, T4) for one of them and parallel to one of the main switches (T1, T2) for the other one.
An aircraft comprising at least such a power supply system.

20 Claims, 11 Drawing Sheets

SWITCHED-MODE POWER SUPPLY SYSTEM AND AIRCRAFT COMPRISING SUCH A SYSTEM

CROSS-REFERENCE TO RELATED APPLICATIONS

This application claims benefit (under 35 USC 119(e)) of French Application Serial No. 12-03580, filed Dec. 21, 2012, which is incorporated herein by reference in its entirety.

The present invention relates to a switched-mode power supply system.

More particularly, the invention relates to an electric power supply system intended to be connected at the input to an electric power source and at the output to a load, comprising:
- a main switching cell comprising a first main branch and a second main branch each including a main switch which may be controlled between an open state and a closed state, and
- an auxiliary switching cell connected to the main switching cell and comprising a first secondary branch and a second secondary branch each including a secondary switch which may be controlled between an open state and a closed state on the one hand, and a connection branch for connecting the auxiliary switching cell to the main switching cell, on the other hand, the connection branch including a switching inductor, the main switching cell and the auxiliary switching cell being connected, cascaded from each other.

This type of electric power supply system notably equips aircraft and is used for providing electric power to electronic equipment.

Such a system is for example described in document <<A Novel Two-quadrant Zero-Voltage Transition Converter for DC Motor Drives>>, in which the power supply system is connected at the output to a traction motor.

The operating principle of these power supply systems is based on the switching of the switches of the main switching cell for regulating the electric power delivered by the power supply system.

During operation of these power supply systems, several elements generate electric power losses.

The switches included in these systems and controlled for opening and closing in order to regulate the delivered electric power, generate electric power losses of two types:
- static losses, which are related to the performance of the switches in conduction and cannot be reduced by modifications of topology of the power supply system, and
- dynamic losses, or switching losses, which are related to the current crossing the switches and to the voltage on their terminals during their opening and their closing, as well as to the duration of their switching.

In the aforementioned document, in order to reduce dynamic losses, the switches of the auxiliary switching cell are controlled for opening and closing via specific control laws so that the switching of the switches of the main switching cell generates fewer losses.

However, the contemplated solution does not give entire satisfaction.

Indeed, in this system, the control of the main and secondary switches is achieved by means of two distinct control laws depending on the operating mode of the traction motor connected to the output of the power supply system: a first control law governs the control of the switches when the motor behaves like a load, and a second control law governs the control of the switches when the motor behaves like a generator.

The control of the switches of the system is therefore particularly complex.

Further, the intrinsic diodes of the switches are used for driving the load current associated with the switch used for generating a voltage resonance on the terminals of the switches of the main switching cell.

This causes significant conduction losses in the diodes because of the passage of the current but also significant losses by conduction in the switches, these losses being related to the recovery current of the diodes.

Finally, the switches of the auxiliary switching cell are controlled so as to switch with zero current and this only upon opening. The described system does not then limit the losses generated by the discharge of parasitic capacitors of the secondary switches.

The object of the invention is therefore to propose a power supply system allowing reduction of the electric power losses.

For this purpose, the invention relates to an electric power supply system as described above, characterized in that the auxiliary switching cell further comprises at least two switching capacitors, a switching capacitor being placed parallel to one of the secondary switches and another switching capacitor being placed parallel to one of the main switches.

According to other advantageous aspects of the invention, the power supply system comprises one or several of the following technical features, taken individually or according to any technically possible combination(s):
- the system further comprises two input terminals, two output terminals, an output filter connected between the output terminals, and an inductor, the inductor being comprised in the output filter or else connected to one of the input terminals and to the main switching cell, said inductor being able to be passed through by an inductor current;
- the system is able to receive an input voltage and to provide at the output an output voltage, the power supply system further comprising control means able to control the opening and closing of the main and secondary switches for slaving the voltage of the power supply system to the input voltage or output voltage, or else slaving the current of the power supply system to the inductor current;
- the control means are configured for controlling the main switches with opposite phases in relation to each other, the main switches being controlled to be either open or closed by the control means also depending on the voltage on the terminals of the main switch of the second main branch of the main switching cell;
- the control means are configured for:
  controlling the closing of the main switch of the first main branch of the main switching cell only if the voltage on the terminals of the main switch of the second branch is greater than a first threshold value, and
  controlling the closing of the main switch of the second main branch of the main switching cell only if the voltage on the terminals of the main switch of the second branch of the main switching cell is less than a second threshold value;
- the control means are configured in order to control the secondary switches with opposite phases in relation to each other, depending on an auxiliary switching current passing through the switching inductor, on the state of the main switches and on the voltage on the terminals of the secondary switch of the second secondary branch of the auxiliary switching cell;

the control means are configured so as to control closing of the secondary switch of the first secondary branch of the auxiliary switching cell:
  if the main switch of the first main branch of the main switching cell is closed and the auxiliary switching current is less than a second current threshold of negative value, and
  if the voltage on the terminals of the secondary switch of the second secondary branch of the auxiliary switching cell is greater than a first secondary threshold value, or else the main switch of the first main branch of the main switching cell is closed and the auxiliary switching current is less than the second current threshold for a predetermined time,
  and to control the opening of the secondary switch of the first secondary branch of the auxiliary switching cell if the main switch of the second main branch of the main switching cell is closed and the auxiliary switching current is greater than a first current threshold of positive value;
the control means are configured so as to control the closing of the secondary switch of the second secondary branch of the auxiliary switching cell:
  if the main switch of the second main branch of the main switching cell is closed and the auxiliary switching current is greater than the first current threshold, and
  if the voltage on the terminals on the secondary switch of the second secondary branch of the switching cell is less than a second secondary threshold value, or else the main switch of the second main branch of the main switching cell is closed and the auxiliary switching current is greater than the first current threshold for a predetermined time,
  and to control the opening of the secondary switch of the second secondary branch of the auxiliary switching cell if the main switch of the first main branch of the main switching cell is closed and the auxiliary switching current is less than the second current threshold,
the auxiliary switching cell only comprises two switching capacitors;
the auxiliary switching cell comprises four switching capacitors respectively placed parallel to one of the main or secondary switches, each switch being associated with a single switching capacitor;
the system further comprises at least three current sensors connected to the control means, two of the current sensors being respectively placed on one and on the other of the secondary branches and the third current sensor being placed on the first main branch of the main switching cell;
the output filter comprises an output capacitor and the inductor, the main switching cell being connected between the auxiliary switching cell and the output filter;
the main switching cell and the output filter form a voltage step-down converter;
the system further comprises two capacitors mounted in series at the input of the power supply system, the output filter being further connected to the capacitors, the main switching cell and the output filter forming a half bridge inverter circuit;
the system further comprises a secondary auxiliary switching cell and a secondary main switching cell connected, cascaded from each other, the secondary auxiliary switching cell and the secondary main switching cell being identical to the auxiliary switching cell and the main switching cell respectively, the output filter, the main switching cell and the secondary main switching cell forming a full-bridge inverter circuit;
the main switching cell is connected at the input to the inductor and at the output to the auxiliary switching cell, the inductor and the main switching cell forming a voltage step-up converter.

Further, the invention relates to an aircraft comprising at least one electric power supply system as described above.

The invention will be better understood upon reading the detailed description which follows, only given as a non-limiting example and made with reference to the appended figures, wherein:

FIG. 1 illustrates an aircraft 2 according to the invention.

The aircraft 2 comprises an electric network 3 and a system 4 for powering electric loads 5.

The network 3 is for example a DC voltage network.

The system 4 is able to receive a DC input voltage Ve and is able to deliver at the output a DC or AC output voltage Vs.

The system 4 is able to provide at the output a regulated electric power, the regulation being carried out in current or in voltage. In the latter case, the output voltage Vs is slaved to a set voltage value.

Figure 1:
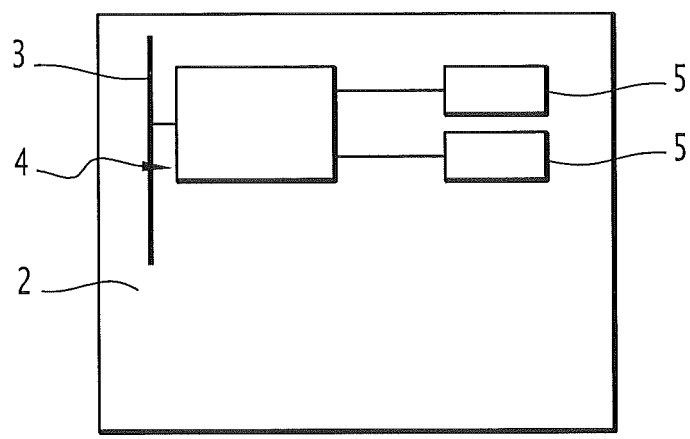
FIG. 1 is a schematic illustration of an aircraft according to the invention.
Figure 2:
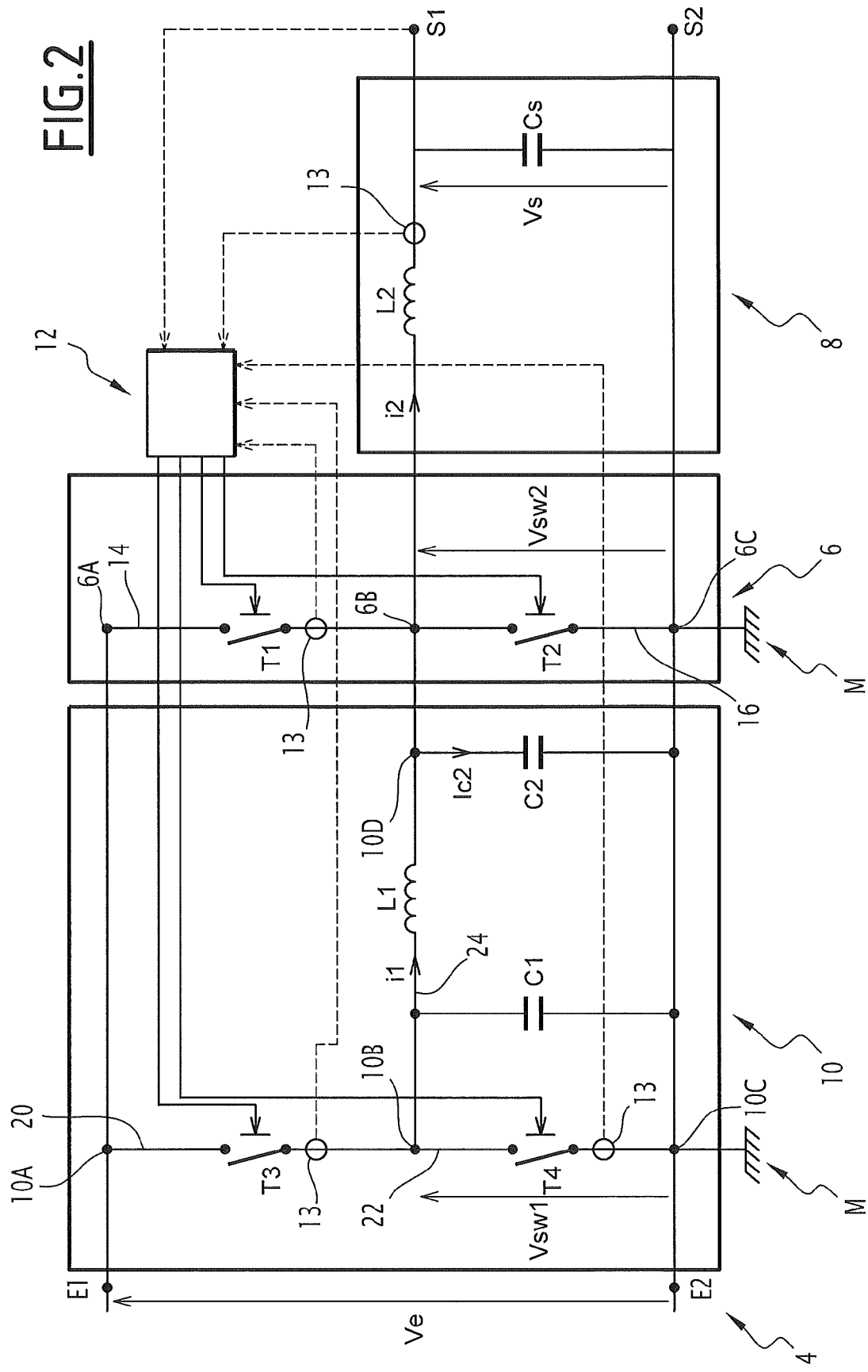
FIG. 2 is a schematic illustration of a power supply system according to the invention.

With reference to FIG. 2, the system 4 comprises a main switching cell 6, hereafter main cell 6, as well as an output filter 8, hereafter filter 8.

The system 4 further comprises an auxiliary switching cell 10, hereafter auxiliary cell 10, as well as control means 12.

Moreover, the system 4 comprises current sensors 13.

Further, the system 4 comprises two input terminals E1, E2 including a positive terminal E1 and a negative terminal E2, and two output terminals S1, S2 including a positive terminal S1 and a negative terminal S2.

The loads 5 are for example different pieces of electronic equipment loaded on board the aircraft 2.

The main cell 6 is able to deliver an inductor current noted as $i_2$ to the output filter 8.

Jointly with the output filter 8, the main cell 6 is able to ensure regulation of the output voltage Vs when the system 4 is voltage-controlled, as well as to ensure regulation of the inductor current $i_2$ when the system 4 is current-controlled.

The main cell 6 comprises three electric points, 6A, 6B, 6C delimiting first and second branches 14, 16, of the main cell 6, hereafter main branches 14, 16.

The electric points 6A, 6B, 6C are adapted for connecting the main cell 6 to the other elements of the system 4 and to the power supply network, notably for connecting the main cell 6 in cascade with the auxiliary cell 10. This is described in more detail in the following.

The first electric point 6A and the second electric point 6B delimit the first main branch 14. The first main branch 14 comprises a main switch T1.

The second electric point 6B and the third electric point 6C delimit the second main branch 16. The second main branch 16 includes a main switch T2. The second main branch 16 is connected to electric ground M via the third electric point 6C.

The second electric point 6B is also connected to the input of the output filter 8, which is found downstream from the main cell 6 according to the flow direction of the current from the input of the system 4 towards the output.

The T1, T2 switches are for example field effect transistors of the MOSFET (Metal Oxide Semiconductor Field Effect Transistor) type.

The voltage on the terminals of the switch T2 of the second main branch 16 is noted as Vsw2 in the following.

The filter 8 is able to filter the current and the voltage delivered at the output of the system 4.

The filter 8 is for example an LC filter. It comprises a filtering inductor L2 passed through by the inductor current $i_2$ and an output capacitor Cs having a voltage on its terminals noted as Vs.

The output capacitor Cs is connected to the output terminals S1, S2 and the filtering inductor L2 is connected to the second electric point 6B of the main cell 6 and to the output terminal S1.

In the example of FIG. 2, the main cell 6 and the output filter 8 form a voltage step-down converter, also known under the name of Buck converter.

The auxiliary cell 10 comprises four electric points 10A, 10B, 10C, 10D delimiting three branches 20, 22, 24 of the auxiliary cell 10. Further, the auxiliary cell 10 comprises two switching capacitors C1, C2, hereafter capacitors C1, C2.

The electric points 10A to 10D are adapted for connecting the auxiliary cell 10 to the main cell 6 and to the other elements of the system 4 and/or to the power supply network 3, and notably for connecting the main cell 6 in cascade with the auxiliary cell 10.

More specifically, the auxiliary cell 10 comprises fourth and fifth electric points 10A and 10B, respectively, which delimit a first secondary branch 20 including a secondary switch T3, hereafter switch T3.

The auxiliary cell 10 comprises a sixth electric point 10C which, jointly with the fifth electric point 10B, delimits a second secondary branch 22 also including the secondary switch T4, hereafter switch T4. The second secondary branch 22 is connected to the ground M via the sixth electric point 100.

The auxiliary cell 10 further comprises a seventh electric point 10D which, jointly with the fifth secondary point 10B, delimits a connection branch 24 including a switching inductor L1. The seventh electric point 10D corresponds to the output terminal of the switching inductor L1.

The auxiliary cell 10 is positioned at the input of the system 4, the fourth electric point 10A corresponding to the input terminal E1 or directly connected thereto, the sixth electric point 100 corresponding to the input terminal E2 or directly connected thereto.

The main cell 6 and the auxiliary cell 10 are connected, cascaded from each other.

More specifically, in the embodiment of FIG. 2, the fourth electric point 10A is connected to the first electric point 6A via an electric connection.

The sixth electric point 100 is connected to the third electric point 6C via an electric connection.

The connection branch 24 is connected to the second electric point 6B directly or via an electric connection.

Further, one of the capacitors C1, C2 of the auxiliary cell 10 is positioned in parallel on a main switch T1, T2 and the other capacitor C1, C2 is positioned in parallel on a secondary switch T3, T4.

In the example of FIG. 2, the capacitor C1 is positioned in parallel on the switch T4 and the capacitor C2 is positioned in parallel on the switch T2.

The capacitors C1, C2 are distinct dedicated capacitors of the intrinsic capacitors of the switches in parallel with which they are positioned.

It should be noted that in practice, the intrinsic capacitors of the switches, these capacitors each having a capacitance also called <<parasitic capacitance>>, contribute to the value of the capacitance of the condensers C1, C2, which allows minimization of the size of the capacitors C1, C2.

The switching inductor L1 is traversed by an auxiliary switching current noted as $i_1$.

The auxiliary switching current $i_1$ is an alternating current, of sinusoidal shape, with a maximum positive value i1_max and with a negative minimum value i1_min.

The auxiliary cell 10 is able to reduce, via the control of the control means 12, the switching losses in the switches T1, T2, as well as to limit the switching losses in the secondary switches T3, T4. This is described in more detail in the following.

The switches T3, T4 are also field effect transistors of the MOSFET type.

The voltage on the terminals of the secondary switch T4 of the second secondary branch 22 is noted as Vsw1 in the following.

The control means 12 are configured in order to slave the voltage of the system 4 to the output voltage Vs, or to slave the current of the system 4 to the inductor current $i_2$, and this by controlling the opening and the closing of the switches T1 to T4 so that the voltage on the terminals and/or the current crossing the switches are small or even zero during their switching.

More specifically, the control means 12 are able to control the main switches T1 and T2 with opposite phases in relation to each other, i.e. so that these switches are never both closed at a given instant, and the secondary switches T3, T4 with opposite phases in relation to each other.

Moreover, the control means 12 are configured for achieving the opening of the switch T3 when the auxiliary switching current $i_1$ becomes greater than a first threshold current i1_th_pos of positive value and the opening of the switch T4 when the auxiliary switching current $i_1$ becomes less than a second current threshold i1_th_neg of negative value. It should be noted that these conditions are not sufficient for opening the switches T3 and T4. The detail of the control of these switches is given hereafter.

The specific value of the current thresholds i1_th_pos and i1_th_neg depends on the slaving mode of system 4, as well as on the capacitors C1, C2, Cs and on the inductors L1 and L2. The determination of the current thresholds i1_th_pos and i1_th_neg is described in more detail in the following.

Figure 3:
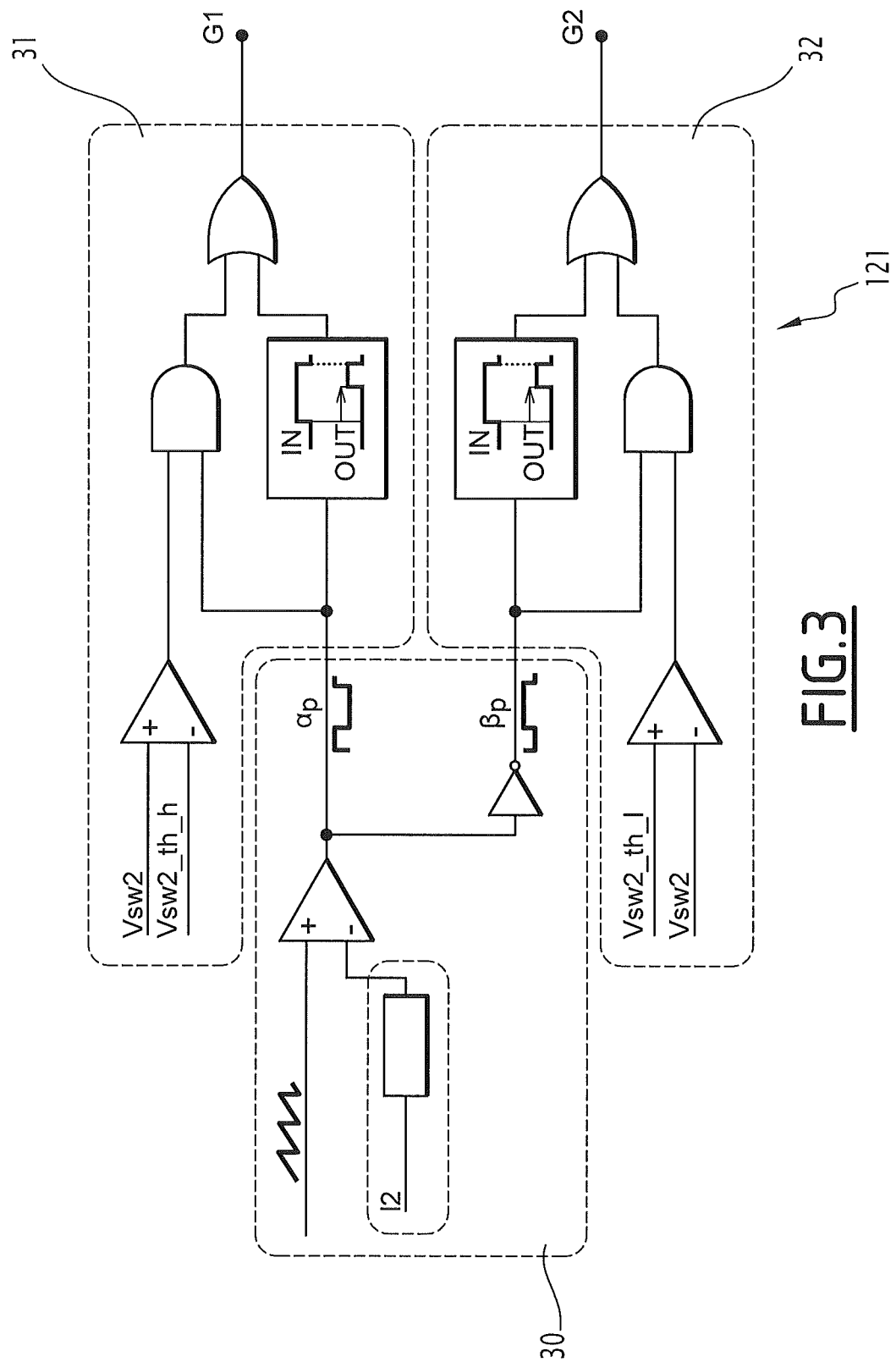
FIG. 3 is a schematic illustration of the principle for controlling a main switching cell of the power supply system of FIG. 2.
Figure 4:
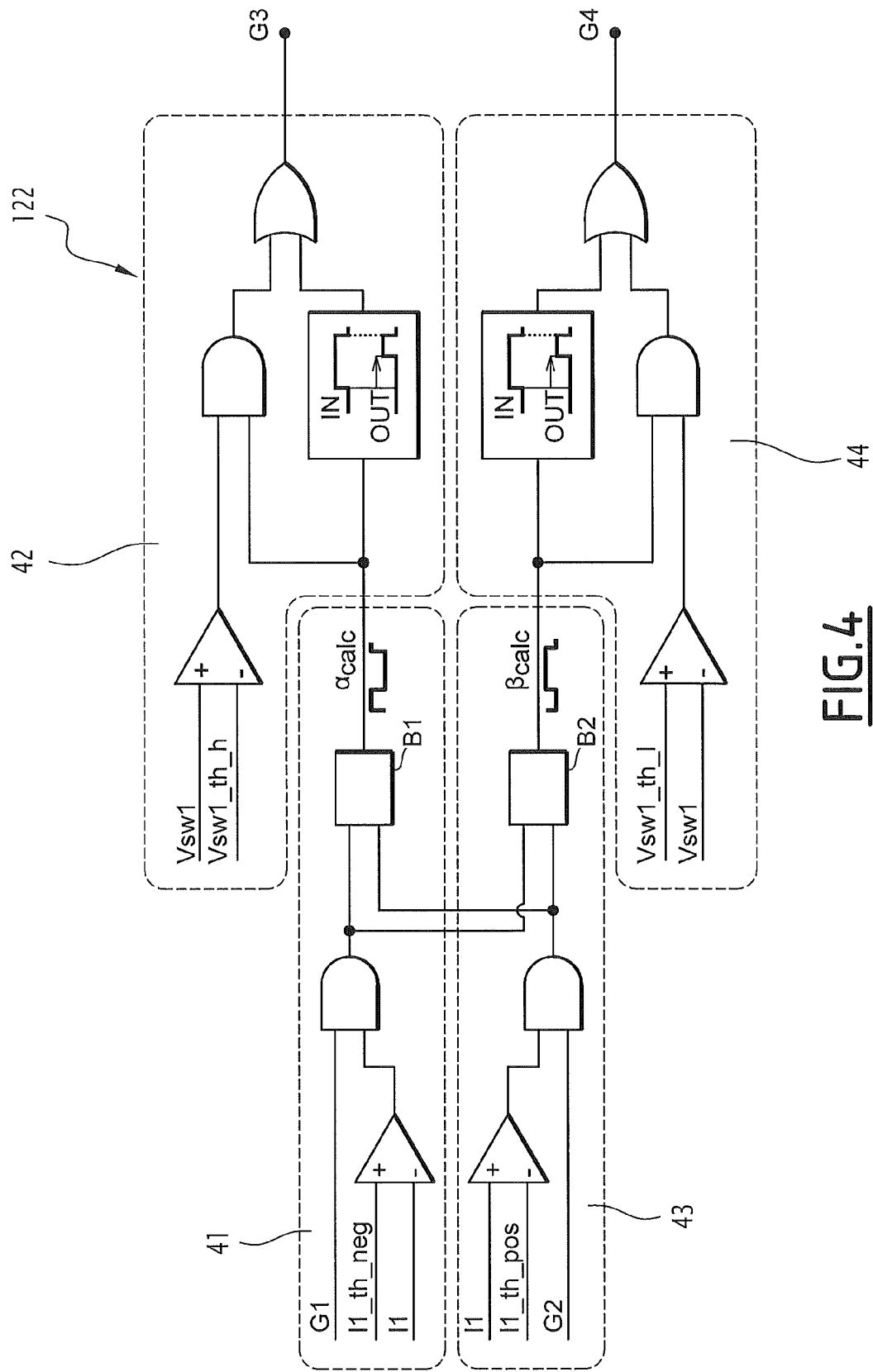
FIG. 4 is a schematic illustration of the principle for controlling a auxiliary switching cell of the power supply system of FIG. 2.

With reference to FIGS. 3 and 4, the control means comprise a first module 121 for controlling the main cell 6 and a second module 122 for controlling the auxiliary cell 10.

Each module 121, 122 comprises the discrete components known to one skilled in the art associated with elementary functions required for applying the control principles: operational amplifiers, comparators, logic AND and OR gates as well as inverter and flip-flops. The detail of the modules 121, 122 is described hereafter.

As an alternative, the control means 12 comprise a programmable logic circuit of the FPGA (Field Programmable Gate Array) type, in which both modules 121, 122 are grouped.

The control means 12 are connected to the output of the current sensors 13 as well as to the output of a sensor (not shown) measuring the output voltage Vs. Further, the control means are connected to the switches T1 to T4.

The current sensors 13 are able to provide to the control means 12 a piece of information representative of the current crossing the units with which they are associated.

The current sensors 13 are positioned at one end of the switches T1, T3 and T4, respectively.

Further, another current sensor 13 is laid out at one end of the filtering inductor L2, for example between the inductor L2 and the output terminal S1 and allows measurement of the inductor current $i_2$.

The sensors associated with the switches T3 and T4 more specifically allow measurement of the auxiliary switching current $i_1$.

The current sensor 13 associated with the switch T1 further allows control of the value of the current intensity flowing in the switches T1 and T2 in order to avoid damaging of the switches T1, T2.

The principles for controlling the cells 6, 10 and the operation of the system 4 according to the invention will now be described with reference to FIGS. 2 to 14 in the case when the system 4 is current-controlled for a peak inductor current $i_2$ with a set value.

It should be noted that the following conditions are met:
the output voltage Vs is less than the input voltage Ve of the system 4, and
the ratio between the inductance value of the switching inductor L1 and the value of the inductance of the filtering inductor L2 is less than or equal to ⅒.

FIG. 3 illustrates the first module 121 of the control means 12 and the principle for controlling the associated main cell 6.

The first module 121 comprises a slaving block 30 associated with the conventional control of the main cell 6, in which the inductor current $i_2$ is transformed by comparison with a carrier signal, into a signal a, with the value 0 or 1.

The signal $\alpha_p$ is directly provided to a first control block 31 associated with the control of the switch T1, and is provided via an inverter (signal $\beta_p$) to a block 32 associated with the control of the switch T2.

The first control block 31 comprises a logic AND gate parallel to a module for delaying the setting of the high value state. Both receive the signal $\alpha_p$ and are connected at the output to a logic OR gate.

The logic AND gate also receives a signal from a comparator which has the value 1 if the voltage Vsw2 on the terminals of the switch T2 is greater than a first threshold value Vsw2_th_h close to the input voltage Ve, and 0 otherwise.

More specifically, the first threshold value Vsw2_th_h is selected to be greater or equal to 95% of the input voltage Ve. This value of the first threshold value Vsw2_th_h allows minimization of the losses in the switch T1. Indeed, the closer this value is to the input voltage Ve, the lower are the switching losses related to the switching of the switch T1.

The first control block 31 then controls the closing of the switch T1 if the signal derived by the logic OR gate has the value 1, and controls the opening of the switch T1 in the opposite case.

It should be noted that the module for delaying the setting to the high state is configured for delivering a signal of value 1 if the signal received by the first control block 31 (signal $\alpha_p$ in the present case) has the value 1 for a predetermined waiting time.

This has the effect that the closing of the switch T1 is still achieved after a predetermined time when the voltage Vsw2 does not exceed the first threshold value, which may occur under transient conditions, for example upon starting the system 4.

The first module 121 also comprises a second control block 32 associated with the control of the switch T2.

The units and the operation of the block 32 are similar to those of the first control block 31, with the difference that the block 32 operates from the complementary signal $\beta_p$ to the signal $\alpha_p$, and in that the signal from the comparator of the second control block 32 has the value 1 if the voltage Vsw2 is less than a second threshold value Vsw2_th_l close to 0. More specifically, the second threshold value Vsw2_th_l is selected to be less or equal to 5% of the input voltage Ve. This value has the effect of minimizing switching losses during the switching of the switch T2. Indeed, the closer this value is to zero, the lower are the switching losses related to the switching of the switch T2.

In a known way, the value of the signal $\alpha_p$ varies cyclically, each cycle bearing the name of cutout period. The cutout period is broken down into a conduction phase and a free-wheel phase. During the conduction phase, the signal $\alpha_p$ has the value 1 and the inductor current $i_2$ increases. During the free-wheel phase, the signal $\alpha_p$ has the value 0 and the inductor current $i_2$ decreases.

The switch T1 is then closed during the conduction phase if the voltage Vsw2 is greater than the first threshold value Vsw2_th_h. At the end of the conduction phase, i.e. when the signal $\alpha_p$ becomes 0 again, the control means 12 open the switch T1.

Conversely, the switch T2 is for example closed during the free-wheel phase if the voltage Vsw2 is less than the second threshold value Vsw2_th_l. The control means 12 then open the switch T2 at the end of the free-wheel phase.

The first module 121 and the principle for controlling the associated main cell 6 give the possibility of both ensuring current-control of the system 4 or voltage-control depending on a set value via the slaving block 30 but also of performing the closing of the switches T1, T2 when the voltage on their terminals is close to zero or even nil via the control blocks 31 and 32. The opening of the switches T1 and T2 is then controlled by the control means 12 depending on the cutout period.

The operating principle of the control means 12 is the same regardless of the slaving mode of the system, the only difference between the slaving modes being located at the slaving block 30 which is then adapted to the relevant mode.

FIG. 4 illustrates the second module 122 and the principle for controlling the associated auxiliary cell 10.

The second module 122 comprises four control blocks 41, 42, 43, 44 hereafter third, fourth, fifth, sixth control blocks, respectively.

The third control block 41 is associated with the switch T3 and comprises a comparator delivering a signal value 1 to a logic AND gate when the auxiliary switching current $i_1$ is less than the second current threshold i1_th_neg, and a value 0 otherwise. The AND gate also receives at the input the output of the first control block 31, and delivers at the output its signal to a flip-flop B1 which the third control block 41 comprises.

The fifth control block 43 is associated with the switch T4 and comprises the same elements as the third control block 41, with the difference that its logic AND gate delivers a signal with the value 1 when the auxiliary switching current $i_1$ is greater than the first current threshold i1_th_pos and the switch T2 is closed. The AND gate of the fifth block 43 delivers its signal to a flip-flop B2 which the fifth control block 43 comprises, but also to the flip-flop B1 of the third control block 41, as well as the logic AND gate of the third control block 41 delivers its signal also to the flip-flop B2 of the fifth control block 43.

The signal delivered by the flip-flop B1, which corresponds to the output signal of the third control block 41, switches to 1 when the output of the logic AND gate of the third block 41 switches to 1, and remains with the value 1 as long as the value of the signal of the logic AND gate of the fifth block 43 remains zero. When the signal of the logic AND gate of the fifth control block 43 switches to 1, the value of the output signal of the flip-flop B1 switches to zero and remains at this value as long as the output of the logic AND gate of the third control block 41 has the value 0.

Conversely, the signal delivered by the flip-flop B2, which corresponds to the output signal of the fifth control block 43, switches to 1 when the output of the logic AND gate of the fifth control block 43 switches to 1, and remains at this value as long as the logic AND gate output of the third control block 41 has the value 0. The signal of the flip-flop B2 switches to the value zero when the output of the logic AND gate of the third control block 41 switches to 1.

The signals delivered by the third and fifth control blocks 41, 43 (signal $\alpha_{calc}$, respectively $\beta_{calc}$) are provided to the fourth, respectively sixth control blocks 42, 44 which are associated with the control of the switch T3, respectively of the switch T4.

The fourth and sixth control blocks 42, 44 have an operation close to that of the first and second control blocks 31, 32.

More specifically, the fourth control block 42 controls the closing of the switch T3 when the signal $\alpha_{calc}$ has the value of 1 and the voltage Vsw1 is greater than a first secondary threshold value Vsw1_th_h close to the input voltage Ve, or if the signal $\alpha_{calc}$ has the value 1 for a period with a predetermined duration while the voltage Vsw1 remains less than the first secondary threshold voltage Vsw1_th_h.

The first secondary threshold value Vsw1_th_h is greater than or equal to 95% of the value of the input voltage Ve, which minimizes switching losses at the switch T3, as previously.

The sixth control block 44 controls the closing of the switch T4 when the signal $\beta_{calc}$ has the value 1 and the voltage Vsw1 is less than a second secondary threshold voltage Vsw1_th_I close to zero, or when the signal $\beta_{calc}$ has the value 1 for a predetermined time, while the voltage Vsw1 remains greater than the second secondary threshold value Vsw1_th_I.

The second secondary threshold value Vsw1_th_I is less than or equal to 5% of the value of the input voltage Ve. This minimizes switching losses at the switch T4 as described earlier.

As a summary, the control means 12 control the closing of the switch T3 if:
the switch T1 is closed and the auxiliary switching current $i_1$ is less than the second current threshold i1_th_neg, and
the voltage Vsw1 is greater than the first secondary threshold value Vsw1_th_h, or else the switch T1 is closed and the auxiliary switching current $i_1$ is less than the second current threshold i1_th_neg for a predetermined time.

The switch T3 is controlled to be open by the control means 12 only if:
the switch T2 is closed, and
the auxiliary switching current $i_1$ is greater than the first current threshold i1_th_pos.

Also, the control means 12 control the closing of the switch T4 if:
the switch T2 is closed and the auxiliary switching current $i_1$ is greater than the first current threshold i1_th_pos, and
the voltage Vsw1 is less than the second secondary threshold value Vsw1_th_I, or else the switch T2 is closed and the auxiliary switching current $i_1$ is greater than the first current threshold i1_th_pos for a predetermined time.

The switch T4 is controlled to be open by the control means 12 only if:
the switch T1 is closed, and
the auxiliary switching current $i_1$ is less than the second current threshold i1_th_neg.

This principle for controlling the auxiliary cell 10 gives the possibility of achieving closing of the switches T3, T4 when the voltage on the terminals of these switches is minimized, which allows reduction in the switching losses at the switches T3 and T4. Further, because the control of the switches T3 and T4 depends on the state of T1 and T2, the switching losses which have been reduced at the switches T1 and T2 are not transferred to the switches T3 and T4.

The operation of the system 4 will now be described in more detail with reference to FIGS. 5 and 6 to 14 for an average positive value of the inductor current $i_2$.

During operation of the system 4, an electric power transfer occurs between the passive elements C1 and L1 on the one hand and C2 and L2 on the other hand.

The equation governing this principle is the following:

$$\frac{1}{2} L1 \times i_1^2 = \frac{1}{2} C_x \times Vswx^2,$$

wherein x is equal to 1 or 2 depending on the operating phase of the system 4.

These power transfers cause the occurrence of a resonance between the passive elements L1 and C1 on the one hand and the elements L1, L2, C2 on the other hand which induces an auxiliary switching current $i_1$ of sinusoidal shape.

The values of the capacitances of the capacitors C1 and C2 are then selected depending on the losses upon opening and upon closing the switch with which the capacitors are associated respectively.

Figure 5:
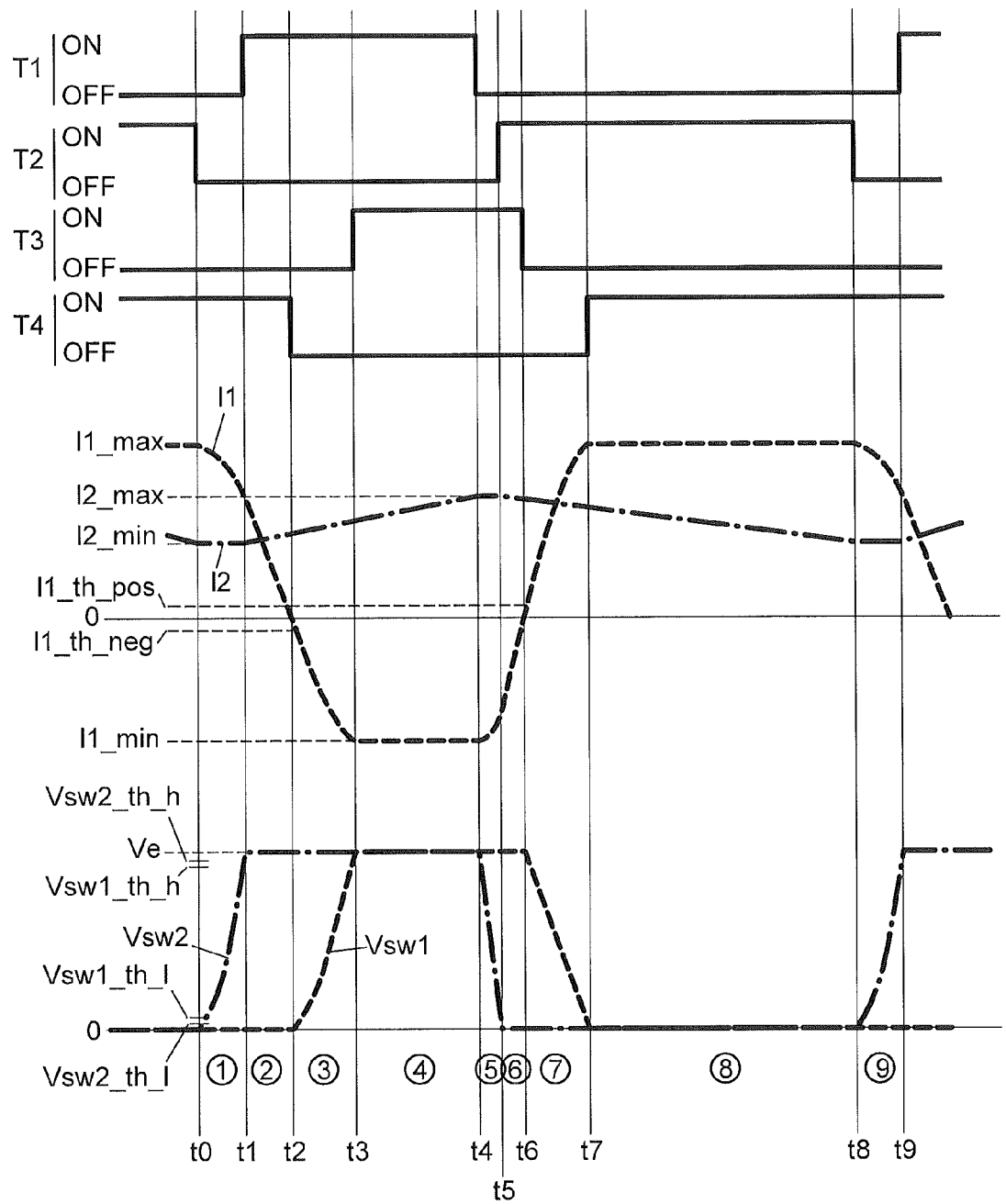
FIG. 5 is a schematic illustration of the variation over time of the main quantities of the power supply system of FIG. 2.

FIG. 5 illustrates the variation over time of the main quantities of the system 4 during a cutout period: the state of the switches T1 and T4, the ON state corresponding to a closed switch, the OFF state to an open switch, the auxiliary switching $i_1$ and inductor $i_2$ currents and the voltages Vsw1, Vsw2 on the terminals of the switch T4, respectively T2.

The maximum and minimum of the current $i_2$ are noted as i2_max and i2_min.

FIGS. 6 to 14 illustrate the flow of the current and $i_2$ in system 4 during operating steps of the system 4.

Before the initial instant t0, the system 4 is in a free-wheel phase. In this state, the switches T2 and T4 are closed, the switches T1 and T3 are open, the auxiliary switching current $i_1$ is maximum, the inductor current $i_2$ decreases to i2_min, and the voltages Vsw1 and Vsw2 are zero.

At instant t0, which marks the beginning of a step 1, the free-wheel phase finishes, and the control means 12 control the opening of the switch T2.

Figure 6:
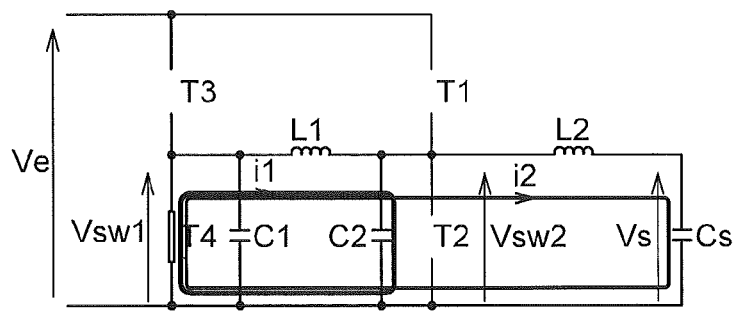
FIGS. 6 to 14 are schematic illustrations of the operation of the power supply system of FIG. 2 during successive periods of FIG. 5.

With reference to FIG. 6, during this step 1, the electric energy stored in the inductor L1 is transferred to the capacitor C1, which causes decrease of the auxiliary switching current $i_1$ and rapid increase of the voltage Vsw2 up to the input voltage Ve. More specifically, the voltage Vsw2 becomes greater than the first main threshold value Vsw2_th_h (instant t1).

At instant t1, the first module 121 controls the closing of the switch T1, which marks the beginning of step 2.

Figure 7:
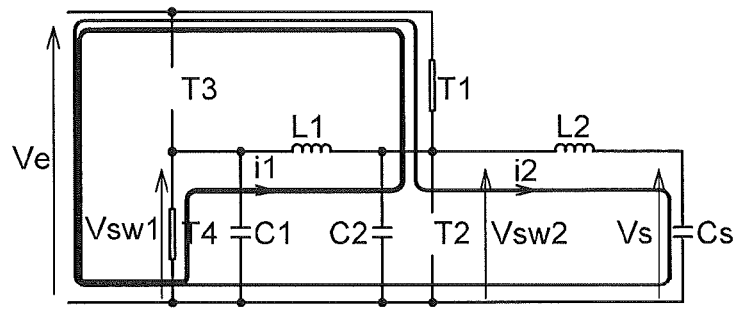

With reference to FIG. 7, during step 2, the auxiliary switching current $i_1$ continues to decrease, until it becomes zero, and more particularly less than the first current threshold i1_th_pos (instant t2).

At instant t2, the second module 122 controls the opening of the switch T4 which marks the beginning of step 3.

Figure 8:
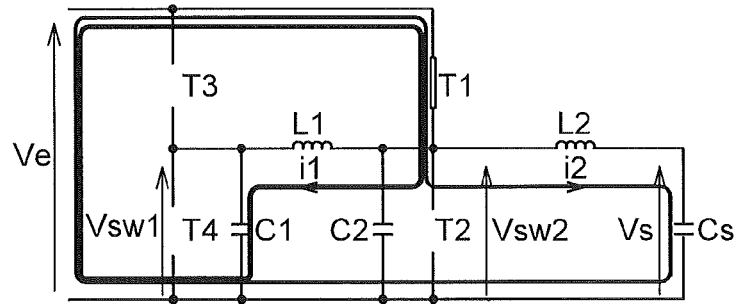

With reference to FIG. 8, during step 3, the electric energy stored in the switching inductor L1 continues to decrease and is transferred to the capacitor C1, which has the effect of causing a rapid increase in the voltage Vsw1 up to the input voltage Ve, and more particularly causes it to exceed the first secondary voltage value Vsw1_th_h (instant t3). At this instant t3, the auxiliary switching current $i_1$ has the value i1_min.

At instant t3, the second module 122 controls the closing of the switch T3, which marks the beginning of step 4, which corresponds to the conduction phase of the cutout period.

Figure 9:
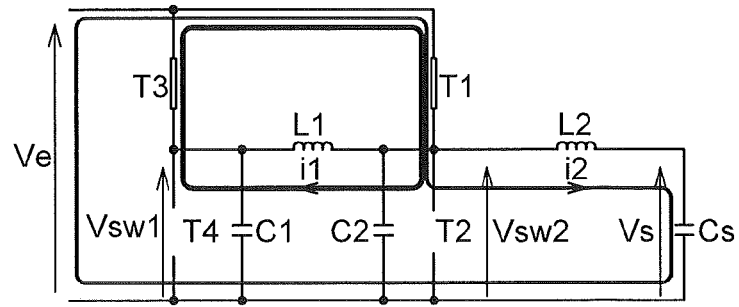

With reference to FIG. 9, during step 4, the value of the auxiliary switching current is maintained at its value i1_min until an instant t4 corresponding to the end of the conduction phase.

At instant t4, the first module 121 controls the opening of the switch T1, which marks the beginning of step 5.

Figure 10:
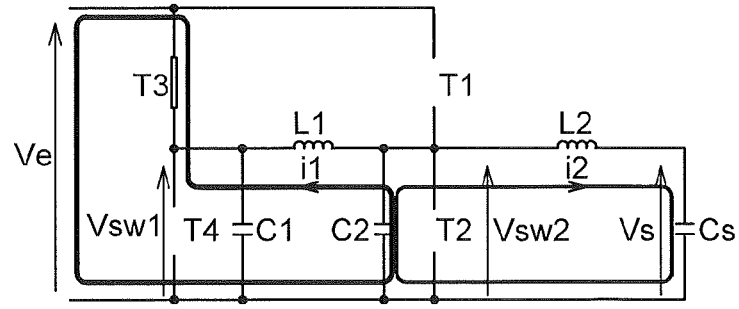

With reference to FIG. 10, during step 5, the capacitor C2 rapidly discharges by imparting its electric energy to the switching inductor L1. Thus, the auxiliary switching current $i_1$ increases and the voltage Vsw2 rapidly decreases down to zero, and more specifically becomes less than the second main threshold value Vsw2_th_l (instant t5).

At instant t5, the first module 121 controls the closing of the switch T2, which marks the beginning of step 6.

Figure 11:
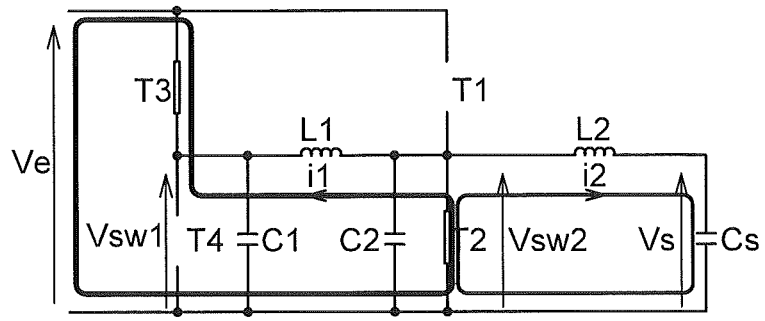

With reference to FIG. 11, during step 6, the voltage on the terminals of the switching inductor L1 is forced to the input voltage Ve, which causes a rapid increase in the auxiliary switching current $i_1$ up to a value close to zero. More specifically, the auxiliary switching current becomes greater than the second current threshold i1_th_neg (instant t6).

At instant t6, the second module 122 controls the opening of the switch T3, which marks the beginning of step 7.

Figure 12:
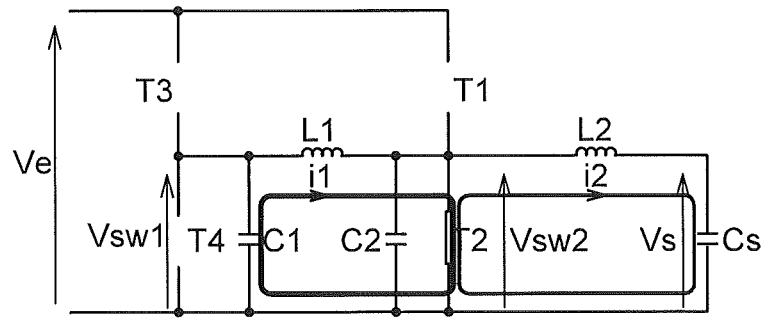

With reference to FIG. 12, during step 7, the capacitor C1 discharges while increasing the auxiliary switching current $i_1$. The voltage on the terminals of the capacitor C1, i.e. Vsw1, becomes zero and more specifically less than the second secondary threshold value Vsw1_th_l (instant t7).

At instant t7, the second module 122 controls the closing of the switch T4, which marks the beginning of step 8.

Figure 13:
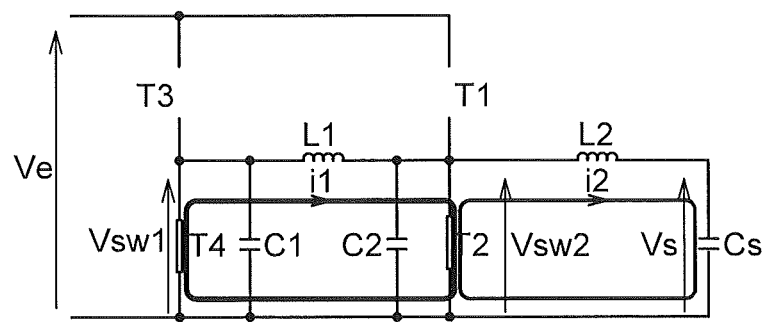
Figure 14:
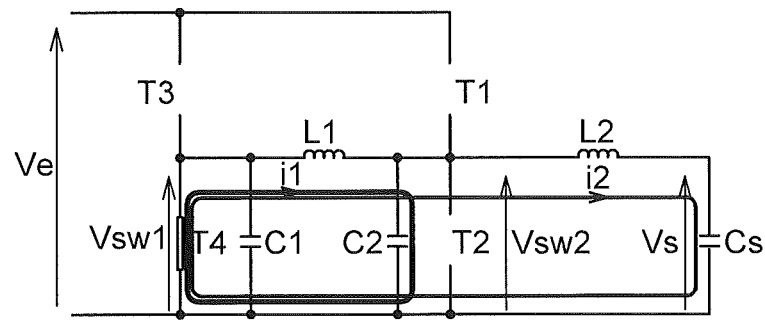

With reference to FIG. 13, during step 8, the auxiliary switching current $i_1$ is maintained. This step 8 corresponds to the free-wheel phase of the cutout cycle.

At instant t9, the free-wheel phase finishes and the first module 121 controls the opening of the switch T2, which marks the beginning of step 9.

Step 1 and step 9 are similar, step 9 marking the beginning of a new cutout cycle of the system 4.

As indicated earlier, the presence of the auxiliary cell 10 and specifically of the switching capacitors C1 and C2 in parallel on a main switch and on a secondary switch, as well as the principles for controlling the main cell 6 and auxiliary cell 10, has the effect of reducing the switching losses occurring during the switching of the main switches T1, T2.

Further, the switching of the secondary switches T3, T4 is itself with low switching losses because their switching is performed when the voltage on their terminals is minimized.

Moreover, the system 4 is adapted so as to operate regardless of the average value of the inductor current $i_2$, and more specifically when the inductor current $i_2$ has a negative or zero average value.

Further, in order to be efficient in these configurations, the system 4 does not require the availability of low recovery diodes such as for example Schottky diodes placed parallel to the switches, which notably has the effect of increasing the conduction losses as well as increasing the number of units of the system.

In an alternative not shown, the switching capacitor C2 is positioned parallel to the switch T1.

In an alternative not shown, the switching capacitor C1 is positioned parallel to the switch T3, and the switching capacitor C2 is positioned parallel to the switch T1.

In an alternative not shown, the system 4 comprises four switching capacitors respectively positioned in parallel to one of the switches T1 to T4, i.e. a switching capacitor in parallel to each of the switches, each switch being associated with a single switching capacitor.

These alternatives are applied depending on the characteristics of the switches T1 to T4, and notably depending on the electric constraints imposed to the system 4, such as for example the input voltage Ve of the system 4. The values of the capacitances of the capacitors C1 to C4 are then determined according to the rise and fall times of the voltages Vsw1 and Vsw2 and on the switching loss levels of the switches.

The determination of the current thresholds i1_th_pos and i1_th_neg will now be described with reference to FIGS. 2, 5, and 6 to 14.

At the second electric point 6B of the main cell 6, when the switch T2 is open, the following equation is satisfied:

$$i1 = i2 + Ic2 \tag{a}$$

Ic2 being the current flowing in the branch including the capacitor C2.

In a simplified way, the variation of the voltage Vsw2 appears as:

$$\frac{dVsw2}{dt} = \frac{Ic2}{C2}. \tag{b}$$

In the following, Ci designates both the capacitor Ci and the capacitance of the capacitor Ci.

Relationship (b) imposes that in order to obtain a sufficiently rapid and great variation of the voltage Vsw2, the current Ic2 should be defined properly.

With reference to FIG. 5, at instant t0 of phase 1, the relationship (b) becomes:

$$\frac{dVsw2}{dt} = \frac{\Delta Ia}{C2},$$

with $\Delta Ia = i1\_max - i2\_min$.

At instant t4, the relationship (b) becomes:

$$\frac{dVsw2}{dt} = \frac{\Delta Ib}{C2},$$

with $\Delta Ib = i1\_min - i2\_max$.

The thresholds i2_max and i2_min are predetermined by the slaving mode of the system 4 and by the nature of the output filter 8. Consequently, only the thresholds i1_min and i1_max may be modified.

During phase 3, the resonance of the auxiliary switching current $i_1$ is of the following form:

$$I1(t) = I1\_th\_neg - Ve * \sqrt{\frac{C1}{L1}} \sin(\omega_0 t), \text{ with } \omega_0 = \sqrt{\frac{1}{L1*C1}}.$$

In a symmetrical way, during phase 7, the auxiliary switching current is expressed in the following form:

$$I1(t) = I1\_th\_pos + Ve * \sqrt{\frac{C1}{L1}} \sin(\omega_0 t).$$

The thresholds I1_th_pos and I1_th_neg thus appear, which are the current levels from which the resonance of the auxiliary switching current i1 occurs.

Further, it is seen that the i1_max and i1_min extrema of the auxiliary switching current are related to the I1_th_pos and I1_th_neg thresholds.

Moreover, the main equations and inequalities of the system 4 during its operation are the following.

During phase 1, in order to guarantee the growth of the voltage Vsw2 up to the input voltage Ve, the following inequalities is satisfied:

$$|i1\_max - i2\_min| \geq Ve * \sqrt{\frac{C2}{\left(\frac{L1*L2}{L1+L2}\right)}} \quad (1)$$

During phase 3, the system 4 naturally guarantees the growth of the voltage Vsw1 and therefore the switching to zero of the voltage of the switch T3. Thus, the following equation is satisfied:

$$Vsw1(t) = Ve * (1 - \cos(\omega_0 t)) - i1\_th\_neg * \sqrt{\frac{L1}{C1}} * \sin(\omega_0 t), \quad (2)$$

Equation (2) imposes that the value of i1_th_neg does not oppose the increase of the voltage Vsw1.

During phase 5, in order to guarantee the decrease of the voltage Vsw2 down to zero, the following inequality is satisfied:

$$|i1\_min - i2\_max| \geq Ve * \sqrt{\frac{C2}{\left(\frac{L1*L2}{L1+L2}\right)}} \quad (3)$$

During phase 7, in order to guarantee the decrease in the voltage Vsw1 down to zero, the following inequality is satisfied:

$$|i1\_th\_pos| \geq Ve * \sqrt{\frac{C1}{L1}} \quad (4)$$

The determination of the thresholds i1_th_neg and i1_th_pos is carried out from the relationships (1) and (3), the obtained results should subsequently satisfy the relationships (2) and (4).

Because at instant t7, the voltage Vsw1 is zero, the expression of the auxiliary switching current i1 at this instant t7 gives:

$$i1\_max = i1\_th\_pos * \cos(\omega_0 * t7)) + Ve * \sqrt{\frac{C1}{L1}} * \sin(\omega_0 * t7), \quad (5)$$

In the same way, because at instant t3, the voltage Vsw1 has the value of the input voltage Ve, the expression of the auxiliary switching current at instant t3 gives:

$$i1\_min = i1\_th\_neg * \cos(\omega_0 * t3)) - Ve * \sqrt{\frac{C1}{L1}} * \sin(\omega_0 * t3) \quad (6)$$

From the relationships (3) and (6), the following relationship is obtained for the threshold i1_th_neg:

$$I1\_th\_neg \leq \frac{1}{\cos(\omega_0 * t3)} * \left(-Ve * \sqrt{\frac{C2}{\left(\frac{L1*L2}{L1+L2}\right)}} + i2\_max + Ve * \sqrt{\frac{C1}{L1}} * \sin(\omega_0 * t3)\right) \quad (7)$$

In the case when the increase in the voltage Vsw1 is perfect and therefore instantaneous (t3=0), the minimum value i1_th_neg_min of the threshold i1_th_neg is obtained, from which the switching of the switches to zero voltage is obtained:

$$i1\_th\_neg\_min = \left(-Ve * \sqrt{\frac{C2}{\left(\frac{L1*L2}{L1+L2}\right)}} + i2\_max\right) \quad (8)$$

In the same way, from the relationships (1) and (5), the following relationship is obtained:

$$i1\_th\_pos \geq \frac{1}{\cos(\omega_0 * t7)} * \quad (9)$$

$$\left(Ve* \sqrt{\frac{C2}{\left(\frac{L1*L2}{L1+L2}\right)}} + i2\_min - Ve* \sqrt{\frac{C1}{L1}} *\sin(\omega_0 *t7)\right)$$

It should be noted that in practice, in the relationships (5), (6), (7) and (9) the instants t3 and t7 are obtained by taking as origin of the times, the instant t2, respectively the instant t6.

In the case when the decrease in the voltage Vsw1 is perfect and therefore instantaneous (t7=0), the maximum value i1_th_pos_max of the threshold i1_th_pos is obtained, from which the switching to zero voltage of the switches is obtained:

$$i1\_th\_pos\_max = \left(Ve* \sqrt{\frac{C2}{\left(\frac{L1*L2}{L1+L2}\right)}} + i2\_min\right) \quad (10)$$

From the relationships (7) to (10), it is seen that the thresholds i1_th_pos and i1_th_neg depend on the passive elements of the system (L1, L2, C1 and C2), on the current levels i2_max and i2_min and on the increase and decrease times of the voltage Vsw1.

The selections of the values of the thresholds i1_th_pos and i1_th_neg is then made so as to obtain a compromise between the switching loss level via the definition of the values of the capacitances of the capacitors C1, C2 on the one hand and the variation rate of the voltage Vsw1 on the other hand.

It should be noted that the values of the thresholds i1_th_pos and i1_th_neg and of the extrema i1_max and i1_min are dependent on the increase and decrease times of the voltages Vsw1 and Vsw2.

The selection of a switching time and of a level of low switching losses will then induce a higher level of conduction losses in the system.

Figure 15:
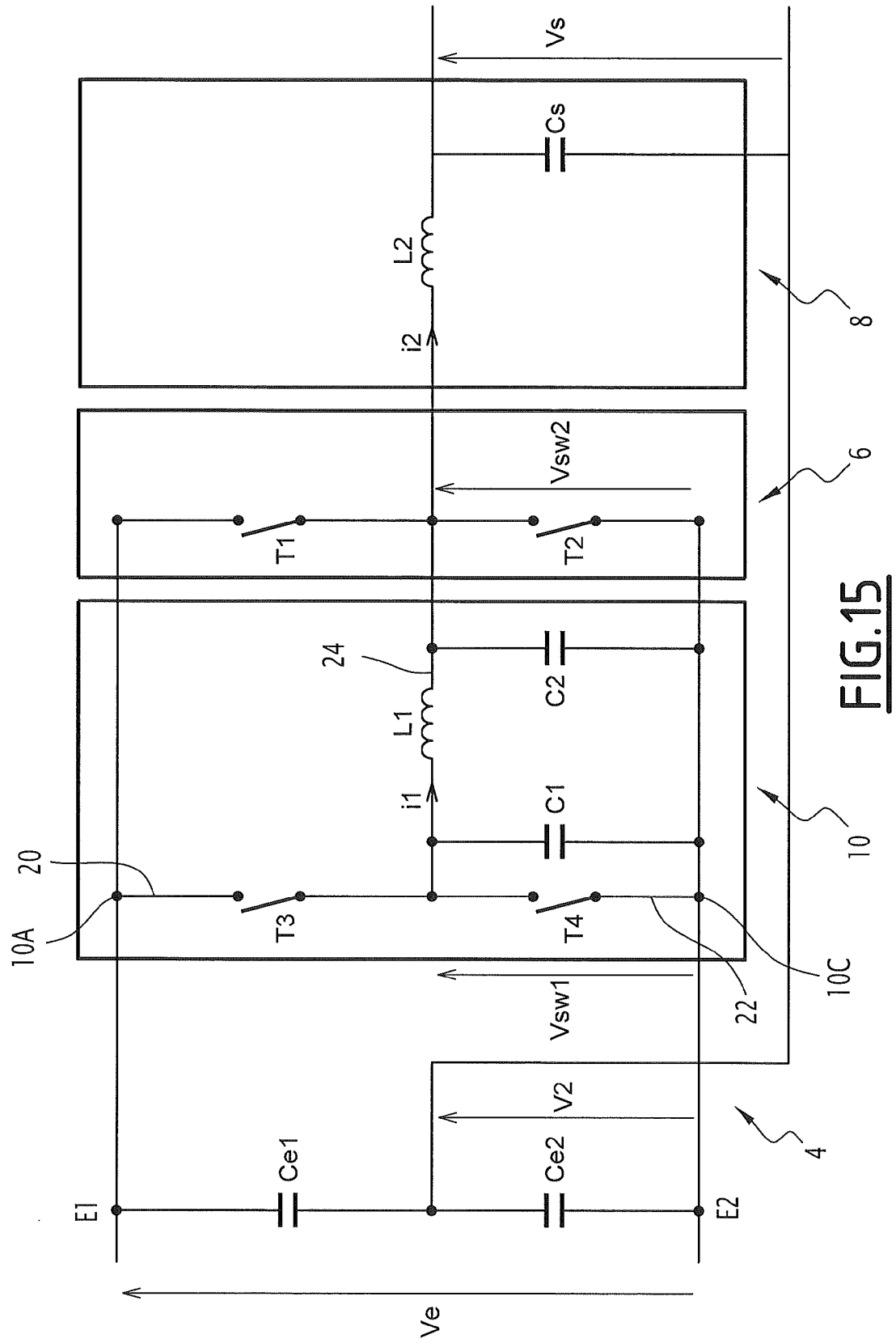
FIG. 15 is a schematic illustration of a power supply system according to a first alternative of the invention.

With reference to FIG. 15, in a first alternative, the system 4 comprises, in addition to the elements described earlier, two capacitors Ce1, Ce2 mounted in series on an electric branch connected to the input terminals E1 and E2 of the system 4. The electric points 10A and 10C of the auxiliary cell 10 are connected to the input terminal E1, respectively E2 of the system 4.

The filtering capacitor Cs is connected to the middle of the series association of both capacitors Ce1, Ce2.

The capacitors Ce1, Ce2, the main cell 6 and the output filter 8 form a half-bridge inverter circuit.

Under permanent conditions, the voltage on the terminals of the capacitors Ce1, Ce1 substantially has the value of Ve/2.

The control of the switches T1 to T4 is carried out in the same way as described earlier.

This alternative is advantageously applied for reducing the losses at the switches in a topology including a half-bridge inverter.

Figure 16:
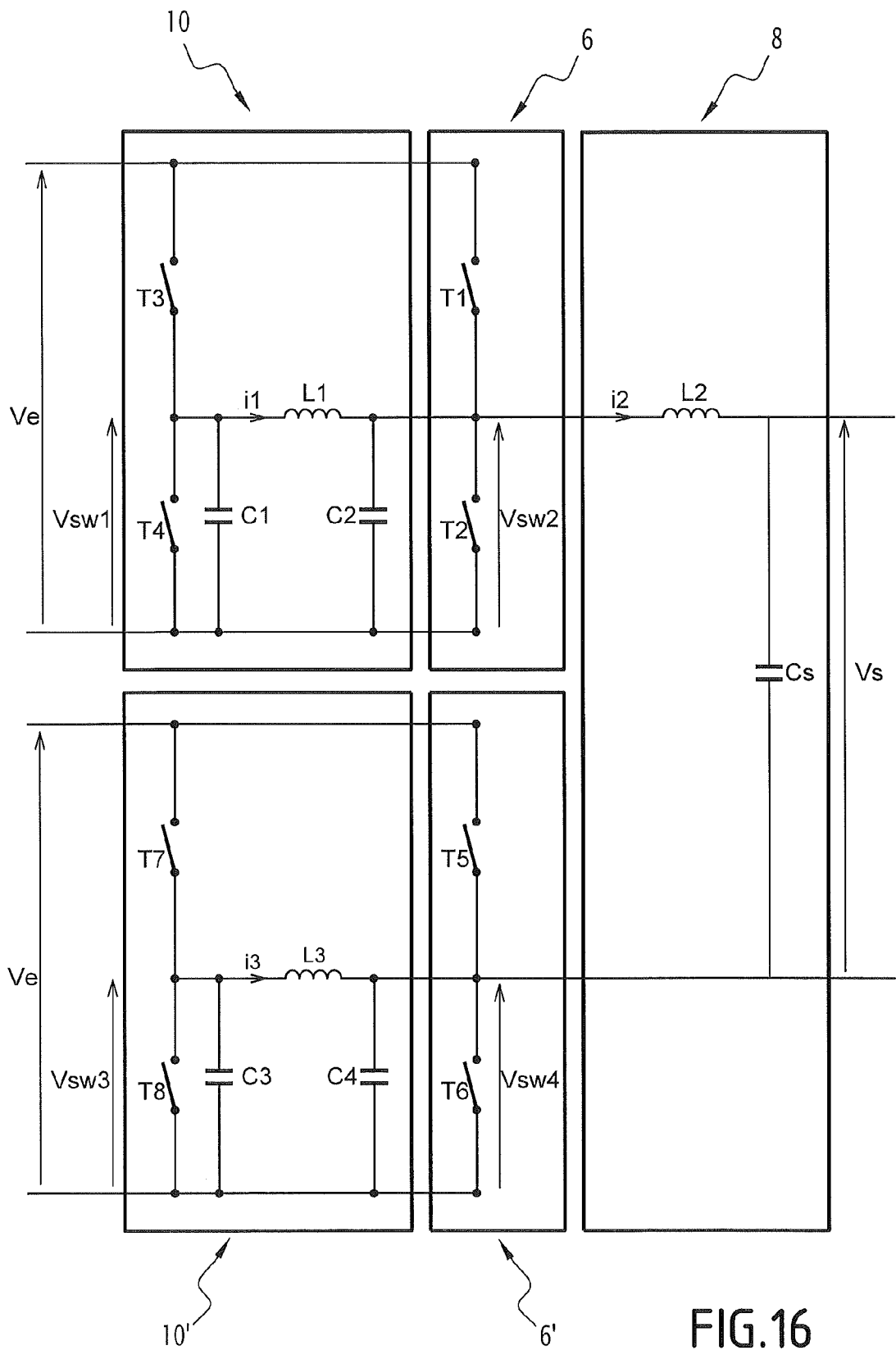
FIG. 16 is a schematic illustration of a power supply system according to a second alternative of the invention.

With reference to FIG. 16, in a second alternative, in addition to the elements described earlier with reference to FIG. 2, the system 4 comprises a secondary main switching cell 6', hereafter the secondary main cell 6', and a secondary auxiliary switching cell 10', hereafter the secondary auxiliary cell 10'.

The secondary main cell 6' and the secondary auxiliary cell 10' are identical with the main cell 6 and with the auxiliary cell 10, respectively, and are connected, cascaded from each other in the same way as the auxiliary cell 10 and the main cell 6 are connected.

The secondary main cell 6' comprises two main switches noted as T5 and T6.

The secondary auxiliary cell 10' comprises two secondary switches noted as T7 and T8 and a switching inductor L3 crossed by a auxiliary switching current $i_3$. Further, the secondary auxiliary cell 10' comprises two switching capacitors C3, C4 positioned for one in parallel on one of the secondary switches T7 and T8 and for the other one in parallel on one of the main switches T5 and T6.

Further, the system 4 comprises secondary current sensors, not shown, connected to the control means 12 and positioned on the branches of the secondary main cell 6' and of the secondary auxiliary cell 10' in the same way as are connected the current sensors 13 relatively to the switching 6 and auxiliary 10 cell.

The secondary main cell 6' is connected at the output to the filtering capacitor Cs.

The secondary auxiliary cell 10' is connected at the input to an electric power source also providing a DC input voltage Ve.

Within the scope of this alternative, the main cell 6, the secondary main cell 6' and the output filter 8 form a full-bridge inverter circuit.

The switches of the switching cell 6 and of the secondary main cell 6' are controlled by the control means 12 by means of a common control law with which it is possible to achieve slaving of the output voltage Vs to a set value for example having an alternating shape and usually sinusoidal.

The switches of the secondary auxiliary cell 10' are then controlled in a similar way to the way the switches of the auxiliary cell 10 are controlled.

More specifically, the switches T7, T8 of the secondary auxiliary cell 10' are controlled according to the state of the switches T5, T6 of the secondary main cell 6', to the auxiliary switching current $i_3$ crossing the switching inductor L3, and to the voltage Vsw3 on the terminals of the secondary switch T8 located on the second branch of the secondary auxiliary cell 10'.

The current and voltage thresholds described earlier for the control of the switches T3 and T4 of the auxiliary cell 10 intervene in a similar way in the control of the switches T7, T8 of the secondary auxiliary cell 10', but have values adapted to the values of the capacitances of the secondary switching capacitors C3, C4 and of the inductance of the switching inductor L3 of the secondary auxiliary cell 10'.

This alternative is advantageously applied for allowing reduction in the electric power losses at the switches in a full bridge inverter topology.

In a particular embodiment of this alternative, the output filter 8 comprises a second filtering inductor L2' interposed between the output of the secondary main cell 6' and the filtering capacitor Cs.

Figure 17:
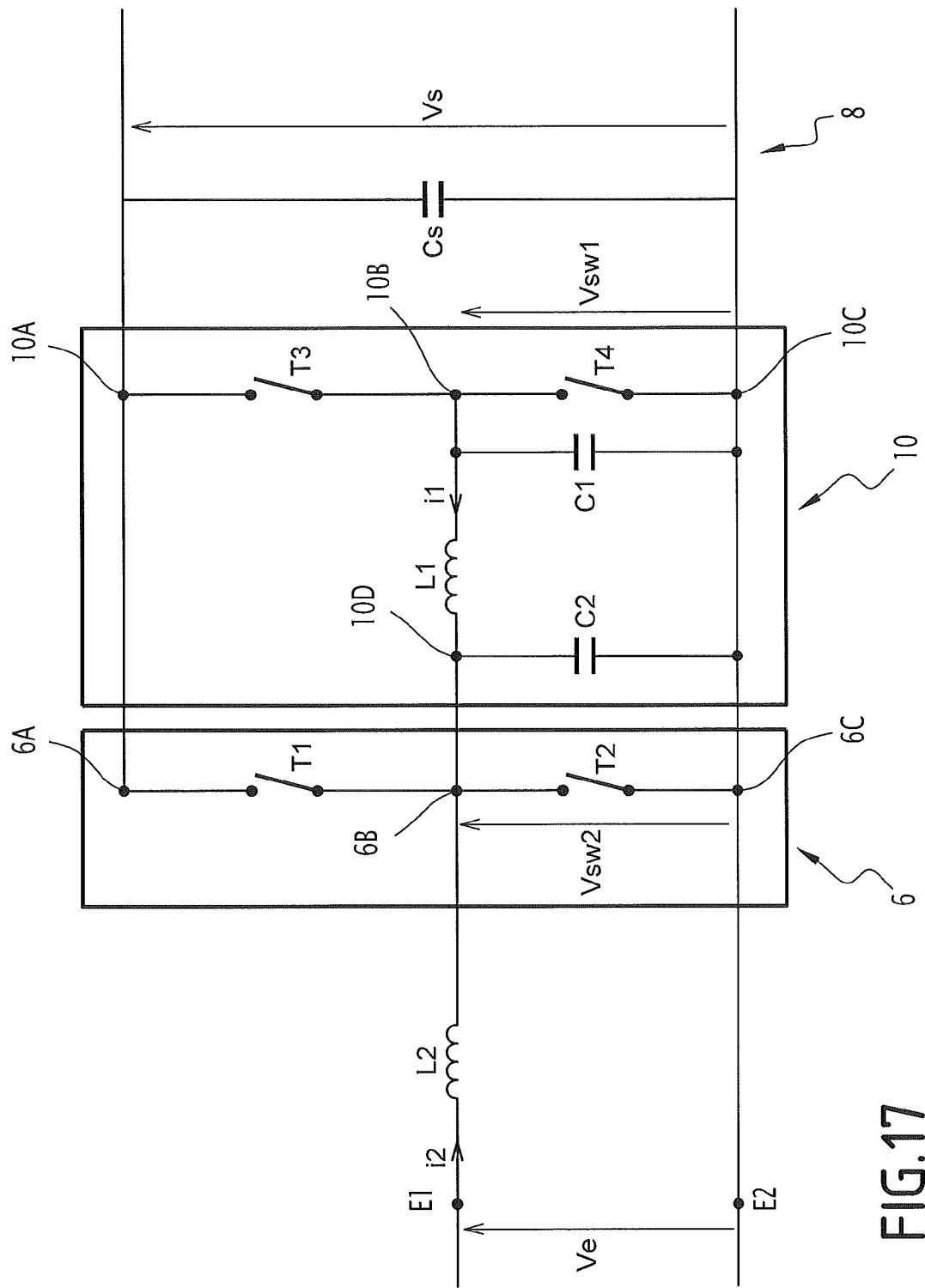
FIG. 17 is a schematic illustration of a power supply system according to a third alternative of the invention.
Figure 18:
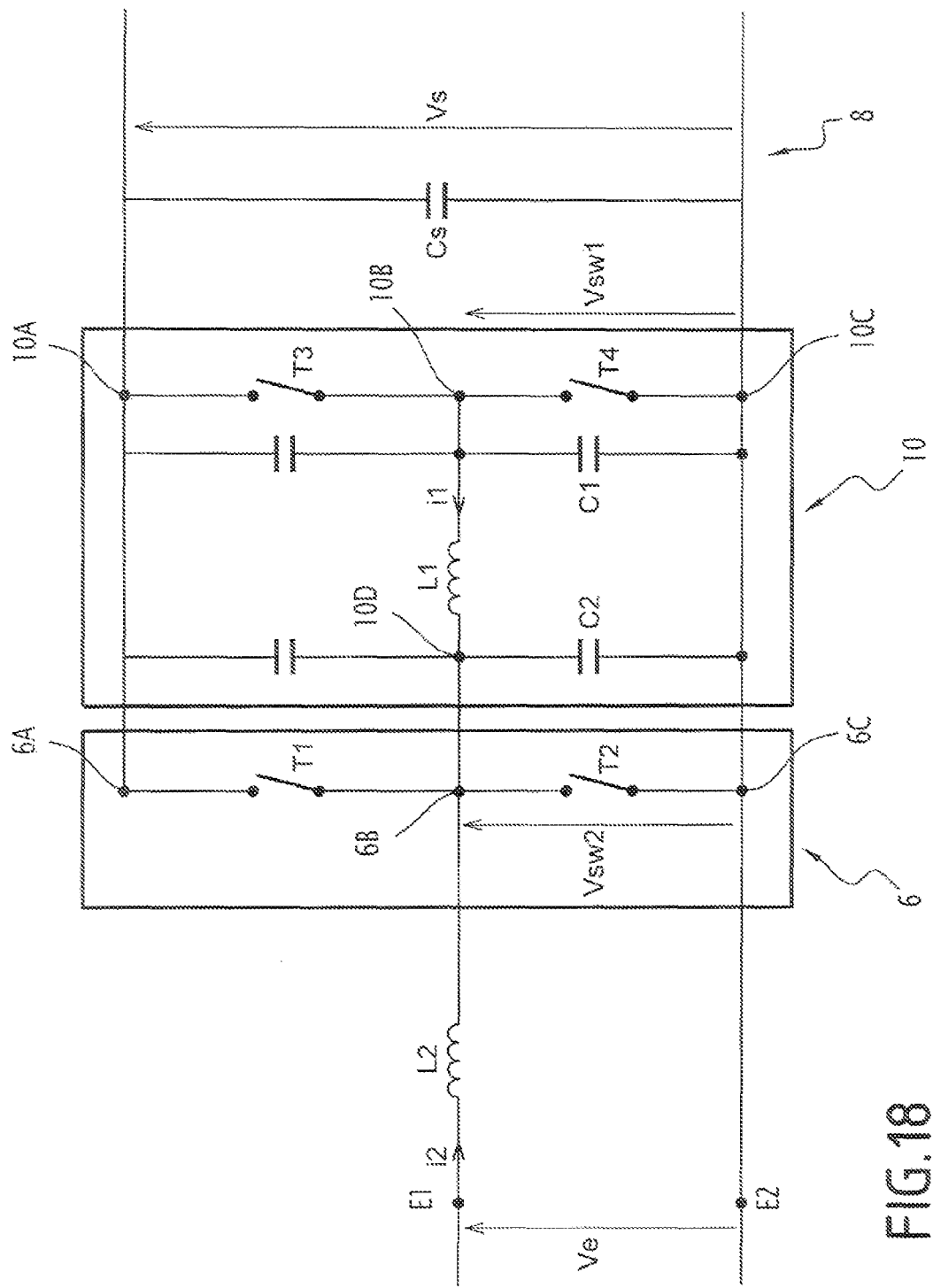
FIG. 18 is a schematic illustration of a power supply system according to a fourth alternative of the invention.

With reference to FIG. 17, in a third alternative, the system 4 comprises the same elements as those described in reference to FIG. 2.

The filtering inductor L2, hereafter the inductor L2, is located at the input of the system 4.

Further, the relative positions of the main cell 6 and of the auxiliary cell 10 are inverted relatively to the arrangement described in FIG. 2, the auxiliary cell 10 being located downstream from the main cell 6.

More specifically, the inductor L2 is connected to the input terminal E1 of the system 4 and to the second electric point 6B of the main cell 6.

The input terminal E2 of the system 4 is connected to the third electric point 6C of the main cell 6.

The seventh electric point 10D of the auxiliary cell 10 is connected to the second electric point 6B of the main cell 6, the first and third electric points 6A and 6C being connected to the fourth, respectively the sixth electric point 10A, 10C which are also connected to the terminals of the output capacitor Cs of the output filter 8.

In the example of FIG. 17, the inductor L2 and the main cell 6 form a voltage step-up converter, also known as a boost converter.

The control principle described for the topology illustrated in FIG. 2 remains the same, the quantities from which the control of the switches T1 to T4 is achieved, remaining identical.

This alternative is advantageously applied in order to allow reduction of the switching losses in a topology including a voltage step-up converter and which does not have the drawbacks described earlier.

The invention claimed is:

1. An electric power supply system intended to be connected at the input to an electric power source and at the output to a load, comprising:
   a main switching cell (6) comprising a first main branch (14) and a second main branch (16) each including a main switch (T1, T2) which is controllable between an open state and a closed state, and
   an auxiliary switching cell (10) connected to the main switching cell (6) and comprising a first secondary branch (20) and a second secondary branch (22) each including a secondary switch (T3, T4) controllable between an open state and a closed state on the one hand, and a connection branch (24) for connecting the auxiliary switching cell (10) to the main switching cell (6), the connection branch (24) including a switching inductor (L1), on the other hand,
   the main switching cell (6) and the auxiliary switching cell (10) being connected, cascaded from each other,
   the auxiliary switching cell (10) further comprising at least two switching capacitors (C1, C2), a switching capacitor (C1) being positioned to parallel to one of the secondary switches (T3, T4) and another switching capacitor (C2) being positioned parallel to one of the main switches (T1, T2),
   the power supply system further comprising two input terminals (E1, E2), two output terminals (S2, S2), an output filter (8) connected between the output terminals (S1, S2) and an inductor (L2), the inductor (L2) being comprised in the output filter (8) or else connected to one of the input terminals (E1, E2) and to the main switching cell (6), said inductor (L2) being capable of being passed through by an inductor current ($i_2$),
   the power supply system being capable of receiving an input voltage (Ve) and of providing at the output an output voltage (Vs), the power supply system (4) further comprising control means (12) able to control the opening and the closing of the main switches (T1, T2) and secondary main switches (T3, T4) for voltage-controlling the power supply system according to the input voltage (Ve) or to the output voltage (Vs), or else current-controlling the power supply system according to the inductor current ($i_2$),
   the control means (12) being configured to control the secondary switches (T3, T4) with opposite phases in relation to each other depending on an auxiliary switching current ($i_1$) passing through the switching inductor (L1), to the state of the main switches (T1, T2) and to the voltage on the terminals of the secondary switch of the second secondary branch of the auxiliary switching cell (Vsw1),
   wherein the control means (12) are configured for controlling the closing of the secondary switch (T3) of the first secondary branch (20) of the auxiliary switching cell (T3):
      if the main switch (T1) of the first main branch (14) of the main switching cell (6) is closed and the auxiliary switching current ($i_1$) is less than a second current threshold (I1_th_neg) of negative value, and
      if the voltage on the terminals of the secondary switch (T4) of the second secondary branch (22) of the auxiliary switching cell (Vsw1) is greater than a first secondary threshold value (Vsw1$_{13}$ th$_{13}$ h), or else the main switch (T1) of the first main branch (14) of the main switching cell (6) is closed and the auxiliary switching current ($i_1$) is less than the second threshold current (I1_th_neg) for a predetermined time,
   and for controlling the opening of the secondary switch (T3) of the first secondary branch (20) of the auxiliary switching cell (10) if the main switch (T2) of the second main branch (16) of the main switching cell (6) is closed and the auxiliary switching current ($i_1$) is greater than a first current threshold (I1_th_pos) of positive value, and
   wherein the control means (12) are configured for controlling the closing of the secondary switch (T4) of the second secondary branch (22) of the auxiliary switching cell:
   if the main switch (T2) of the second main branch (16) of the main switching cell is closed and the auxiliary switching current ($i_1$) is greater than the first current threshold (I1_th_pos), and
   if the voltage on the terminals of the secondary switch of the second secondary branch of the auxiliary switching cell (Vsw1) is less than a second secondary threshold value (Vsw1_th$_{13}$ 1), or else the main switch (T2) of the second main branch (16) of the main switching cell is closed and the auxiliary switching current ($i_1$) is greater than the first current threshold (I1_th_pos) for a predetermined time,
   and for controlling the opening of the secondary switch of the second secondary branchy (22) of the auxiliary switching cell (T4) if the main switch of the first main branch (14) of the main switching cell (6) is closed and the auxiliary switching current ($i_1$) is less than the second current threshold (i1_th_neg).

2. The system according to claim 1, wherein the control means (12) are configured for controlling the main switches (T1, T2) with opposite phases in relation to each other, the main switches (T1, T2) being controlled to be open or closed by the control means (12) also depending on the voltage on the terminals of the main switch of the second main branch of the main switching cell (Vsw2).

3. The system according to claim 2, wherein the control means (12) are configured for:
   controlling the closing of the main switch (T1) of the first main branch (14) of the main switching cell (6) only if the voltage on the terminals of the main switch of the second branch (Vsw2) is greater than a first threshold value (Vsw2_th_h), and
   controlling the closing of the main switch (T2) of the second main branch (16) of the main switching cell (T2) only if the voltage on the terminals of the main switch on the second branch of the main switching cell (Vsw2) is less than a second threshold value (Vsw2_th$_{-1}$).

4. The system according to claim 3 wherein the auxiliary switching cell (10) only comprises two switching capacitors (C1, C2).

5. The system according to claim 3 wherein the auxiliary switching cell (10) comprises four switching capacitors respectively positioned parallel to one of the main switches (T1, T2) or secondary switches (T3, T4), each switch (T1, T2, T3, T4) being associated with a single switching capacitor.

6. The system according to claim 3 further comprising at least three current sensors (13) connected to the control means (12), two of the current sensors (13) being respectively positioned on one and on the other of the secondary branches (20, 22) and the third current sensor (13) being positioned on the first main branch (14) of the main switching cell (T1).

7. The system according to claim 2 wherein the auxiliary switching cell (10) only comprises two switching capacitors (C1, C2).

8. The system according to claim 2 wherein the auxiliary switching cell (10) comprises four switching capacitors respectively positioned parallel to one of the main switches (T1, T2) or secondary switches (T3, T4), each switch (T1, T2, T3, T4) being associated with a single switching capacitor.

9. The system according to claim 2 further comprising at least three current sensors (13) connected to the control means (12), two of the current sensors (13) being respectively positioned on one and on the other of the secondary branches (20, 22) and the third current sensor (13) being positioned on the first main branch (14) of the main switching cell (T1).

10. The system according to claim 1 wherein the auxiliary switching cell (10) only comprises two switching capacitors (C1, C2).

11. The system according to claim 10 wherein the auxiliary switching cell (10) comprises four switching capacitors respectively positioned parallel to one of the main switches (T1, T2) or secondary switches (T3, T4), each switch (T1, T2, T3, T4) being associated with a single switching capacitor.

12. The system according to claim 10 further comprising at least three current sensors (13) connected to the control means (12), two of the current sensors (13) being respectively positioned on one and on the other of the secondary branches (20, 22) and the third current sensor (13) being positioned on the first main branch (14) of the main switching cell (T1).

13. The system according to claim 1 wherein the auxiliary switching cell (10) comprises four switching capacitors respectively positioned parallel to one of the main switches (T1, T2) or secondary switches (T3, T4), each switch (T1, T2, T3, T4) being associated with a single switching capacitor.

14. The system according to claim 1 further comprising at least three current sensors (13) connected to the control means (12), two of the current sensors (13) being respectively positioned on one and on the other of the secondary branches (20, 22) and the third current sensor (13) being positioned on the first main branch (14) of the main switching cell (T1).

15. The system according to claim 1, wherein the output filter (8) comprises an output capacitor (Cs) and the inductor (L2), the main switching cell (6) being connected between the auxiliary switching cell (10) and the output filter (8).

16. The system according to claim 15, wherein the main switching cell (6) and the output filter (8) form a voltage step-down converter.

17. The system according to claim 15, further comprising two capacitors (Ce1, Ce2) mounted in series at the input of the power supply system (4), the output filter (8) being further connected to the capacitors (Ce1, Ce2), the main switching cell (6) and the output filter (8) forming a half-bridge inverter circuit.

18. The system according to claim 15, further comprising a secondary auxiliary switching cell (10') and a secondary main switching cell (6') connected, cascaded from each other, the secondary auxiliary switching cell (10') and the secondary main switching cell (6') being identical with the auxiliary switching cell (10) and with the main switching cell (6) respectively, the output filter (8), the main switching cell (6) and the secondary main switching cell (6') forming a full-bridge inverter circuit.

19. The system according to claim 1 wherein the main switching cell (6) is connected at the input to the inductor (L2) and at the output to the auxiliary switching cell (10), the inductor (L2) and the main switching cell (6) forming a voltage step-up converter.

20. An aircraft, comprising: at least one electric power supply system (4) according to claim 1.

* * * * *